Aug. 14, 1951  J. ISREELI ET AL  2,564,306
APPARATUS FOR PROPORTIONALLY BLENDING LIQUIDS
Filed Aug. 3, 1948
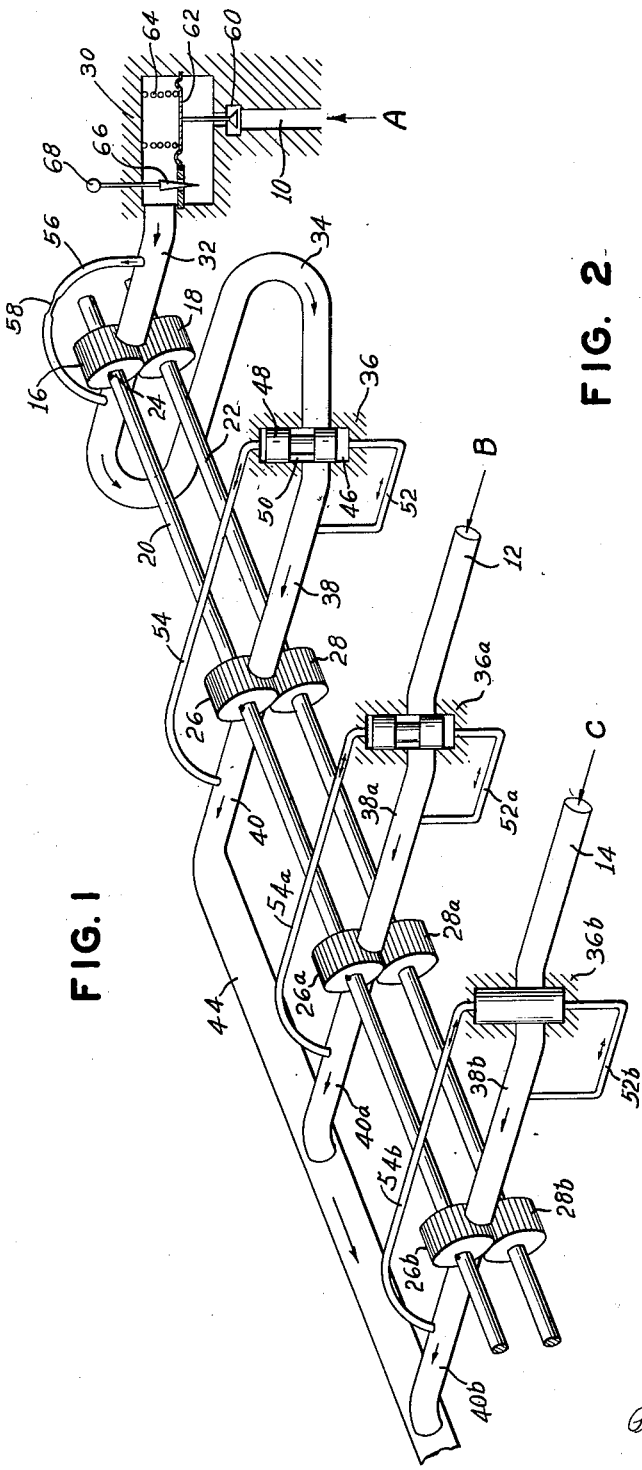
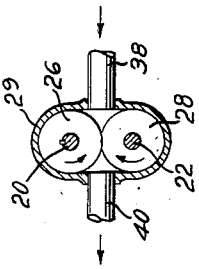
INVENTORS
Jack Isreeli
George T. Allen
BY
Pennie, Edmonds, Morton and Barrows
ATTORNEYS Patented Aug. 14, 1951

2,564,306

UNITED STATES PATENT OFFICE 2,564,306

APPARATUS FOR PROPORTIONALLY BLENDING LIQUIDS

Jack Isreeli and George T. Allen, New York, N. Y., assignors to Simmonds Aerocessories Inc., Tarrytown, N. Y., a corporation of New York Application August 3, 1948, Serial No. 42,278

6 Claims. (Cl. 137—165)

1

This invention relates to improvements in apparatus for combining liquids or for combining two or more streams of liquids into a single stream. More particularly, the invention relates to a precision apparatus by which separate streams of liquid are metered at definite related rates of flow and combined into a single stream or delivered into a single chamber or other apparatus.

The flow combiner of the present invention is useful in various industries for the preparation of liquid mixtures, in the feeding of various liquids to be reacted and for other purposes. The flow combiner is adapted to accurately proportion the liquids supplied thereto. The apparatus is also useful as a component of such devices as guided missiles where fuels and oxidizers are frequently stored in invidiual pressure chambers from which they are emptied and allowed to combine in the combustion chamber of the missile. In such devices the fuels and oxidizers must be proportioned accurately and such proportioning and combining is effectively accomplished by the combiner apparatus of the present invention.

In certain industries and chemical operations materials are fed from individual storage containers or supply sources and mixed together under controlled conditions, but for the most part the flow combining apparatus now in use constitute assemblages of flow controllers or other devices or fluid measuring instruments, so that for accurate work, a very complicated and expensive system is required.

The primary object, therefore, of the present invention is to provide a compact flow combiner adapted to supply and combine two or more liquids, so that the quantities delivered are always accurately proportioned.

In accordance with the present invention, the improved flow combiner for metering a number of liquids in known predetermined proportions, and combining them, comprises a plurality of pairs of metering gears equal to the number of liquid streams to be combined, the pairs of gears being mounted in parallel, means for driving the pairs of metering gears, means associated with the driving means for driving the plurality of pairs of gears at the same or some predetermined rate with respect to each other, means for separately supplying a liquid to each pair of metering gears and means for delivering the metered liquid from each pair of metering gears to a common receiver.

In a preferred form of the flow combiner system each pair of metering gears is provided with

2 a pressure balancing valve, mounted in the inlet line for the liquid, for balancing the pressures across the metering gears and thereby preventing leakage through the gears which would otherwise be caused by a pressure drop across the gears in the direction of flow. The improved apparatus also preferably includes means for utilizing one of the liquids to be metered for driving the set of metering gears. Such means advantageously includes a pair of gears arranged like a gear pump but used as a motor by forcing one of the liquids therethrough. Connections are provided between this pair of motor gears and the sets of metering gears for driving the latter.

An advantageous construction in accordance with the foregoing includes a system in which one of the liquids to be combined with one or more other liquids is forced through the pair of motor gears, one of the gears of which is fixed to a driving shaft common to one gear of each of the pairs of metering gears. In this system the liquid used for driving the motor gears is passed through one of the pairs of metering gears and combined with the other liquids delivered through the remaining pairs of metering gears.

Where the circumstances require the metering of the liquids at a definite rate, the system advantageously includes a second metering device for at least one of the liquids, for example, for the stream of liquid used for driving the pair of motor gears and which liquid then passes through a set of metering gears.

The improved system includes other features and combinations which will be described in detail hereinafter in connection with one particular embodiment, although it will be understood that other embodiments differing in detail from that shown and described, may be used.

In the drawings forming a part of this application:

Fig. 1 is a diagrammatic broken view partly in perspective and partly in vertical section of an apparatus constructed in accordance with the present invention.

Fig. 2 is a cross-sectional view taken through one of the pairs of metering gears.

In the particular embodiment of the flow combiner shown in Fig. 1 of the drawings, the apparatus is illustrated in connection with the proportioned metering of and combining of three separate liquids A, B and C, supplied at a superatmospheric pressure from three pressure containers or sources, respectively through pipes 10, 12 and 14. The apparatus for handling these liquids includes a pair of inter-meshing motor gears 16 and 18 mounted in a housing, not shown, and respectively arranged on relatively long shafts 20 and 22 with the gear 16 keyed at 24 to the shaft 20. Gear 18 is rotatable on the shaft 22 which may be fixed, while the shaft 20 constitutes a drive shaft for the metering gear members mounted thereon.

The drive shaft 20 and the shaft 22 are associated with as many pairs of metering gears as there are liquids, in the particular problem, to be metered and combined in definite proportions. As illustrated, the shafts 20 and 22 carry pairs of metering gears 26 and 28, 26a and 28a, and 26b and 28b. The gears 26, 26a and 26b are keyed to the drive shaft 20 as shown, the three pairs of metering gears being proportioned with respect to each other in accordance with the relative proportions of the liquids to be metered. While it is convenient to make all of the gears of the same diameter and same cut for the teeth and merely vary their lengths, it will be understood that the different pairs of gears may differ in diameter and in other respects to achieve the proper proportions for the liquids to be metered and combined. The gears are all mounted in housings in the conventional manner as illustrated in Fig. 2, in which the pair of gears 26—28 are shown in a housing 29.

The liquid A, which may be the liquid of largest volume used in making up the composition, is delivered through the pipe 10, a rate-of-flow establishing device 30, and a pipe 32, to the pair of motor gears 16 and 18, which act as a hydraulic motor for driving the shaft 20 and the pairs of metering gears associated therewith. The liquid passed through the gears 16 and 18 is conducted under pressure through a pipe 34, a pressure balancing valve 36 and a pipe 38 to the pair of metering gears 26 and 28. As these gears are rotated they deliver the liquid A through a discharge pipe 40 into a mixing pipe 44 which may in fact be a chamber, a reactor or other device in which the liquids are to be combined, reacted or used together. In the case of a guided missile the member 44 may be the combustion chamber.

The liquid B, delivered through the pipe 12, passes through a pressure balancing valve 36a, a pipe 38a, through the metering gears 26a and 28a, and a pipe 40a into the mixing pipe 44.

The liquid C, introduced through the pipe 14, passes through a pressure balancing valve 36b, a pipe 38b, the metering gears 26b and 28b, and a pipe 40b into the mixing pipe 44.

The pressure balancing valves 36, 36a and 36b, are alike and they each serve to eliminate the pressure drop across the respective pairs of metering gears. The valve 36, for example, comprises a mounting having a cylindrical chamber 46 in which is mounted a spool-like piston 48 having a central passageway 50 for liquid flowing from pipe 34 to the pipe 38. One end of the cylinder 46, the lower end, is connected into the inlet line 38 by a pipe 52, while the opposite end of the cylinder 46 is connected into the outlet pipe 40 by a pipe 54.

The balancing valve 36 eliminates the pressure drop across the metering gears 26 and 28 because of the respective actions of the liquid under pressure in the pipes 38 and 40 on the piston-like valve member 48. For example, if the pressure down-stream from the gears, that is, in the line 40, builds up to a value higher than the pressure at the inlet to the gears, the piston 48 is moved by the pressure in the line 54 in a direction to increase the opening through the valve so that the up-stream pressure, that is, the pressure in the line 38 can increase. On the other hand, if the pressure in the line 38 is in excess of the pressure in the line 40, the piston member 48 moves in the opposite direction, that is, to close the valve and balance the pressure across the gears 26 and 28. This movement creates a greater pressure drop across the valve 36 and reduces the inlet pressure to the pair of gears until it equals that in the line 40. For any given flow, the valve piston 48 will assume a stable position. The pressure balancing valves 36a and 36b operate in the same way as the valve 36 with respect to corresponding metering gears.

The gears 16 and 18 are not pressure balanced but serve as a hydraulic motor for driving the metering gears. It will be noted that the capacity of the motor gears and the metering gears 26 and 28 must have a rather close relationship because the volume of liquid passed through the gears 16 and 18 must pass through the gears 26 and 28. However, in order to avoid the expense of making these two sets of gears exactly alike, the pair of gears 16 and 18 are designed to supply a quantity of liquid different from and preferably less than that which would be passed by the gears 26 and 28. The remaining liquid required to make up the difference is conducted through a bypass line 56 connected into the lines 32 and 34 and having restriction means which may be in the form of an orifice 58. The proportion of liquid in line 34 delivered through the bypass line 56 is established on the basis of permissible pressure drops across the gears 16 and 18. If a higher pressure drop is permissible the gears may be made considerably smaller than the gears 26 and 28 and the bypass orifice 58 may be correspondingly larger. Where a high pressure drop is not permissible the gears 16 and 18 are made nearly as large as the gears 26 and 28 while the bypass orifice 58 is made correspondingly smaller.

The capacities of the pairs of metering gears are determined in advance according to the proportions of the liquids to be metered and combined, so that the entire flow combiner is made for a particular purpose with the pairs of gears properly proportioned with respect to each other. The pairs of metering gears may be varied by varying their diameters, widths, or cut of the teeth, in order to obtain the desired proportionate flow. All gears rotate at the same speed because each pair includes a gear keyed to the shaft 20. In a particular instance, the total rate of flow through any one or all of the gears is determined by the rate of rotation. The rate at which the combined liquid is supplied may therefore be varied by varying, for example, the rate at which liquid is supplied through the pipe 32. This will vary the rate of rotation of a given set of gears and therefore vary the rate at which the liquids are delivered into the pipe 44.

Where the combined liquid in the pipe 44 must be metered and delivered at a definite rate, at least one of the liquids delivered to the apparatus must be metered. The metering device 30 is provided for this purpose, that is, for establishing the rate of flow of one of the liquids to be combined in the pipe 44, the proportions of other liquids and rate of supply of the combined liquids being established by the pairs of metering gears in the manner described.

The liquid A supplied through the pipe 10 under pressure flows through a valve 60 controlled by a diaphragm 62 acted upon by a spring 64 which biases the valve to open position. The liquid A entering the metering device 30 below the diaphragm 62 passes through a jet controlled by a profiled needle 66 into the space on the opposite side of the diaphragm and into the pipe 32. The profiled needle is positioned by a means 68 which, if desired, may be operated by any automatic device, suitable servo mechanism, from a remote position, or by other means, to establish a given jet area. A fixed jet area may be used if suitable to the application.

In the device as shown, the spring-loaded diaphragm 62 controlling the valve 60, establishes a metering pressure across the metering jet, the spring 64 establishing the actual metering pressure. Since the diaphragm is a flexible device it moves to relieve maximum force on either side. The spring loading plus the hydraulic loading on the upper side must counterbalance the hydraulic loading on the opposite side. For instance, if the spring loading plus its corresponding hydraulic loading exceeds the opposite hydraulic loading, the diaphragm 62 will move to open the inlet valve 60, thereby providing a higher pressure on the lower side of the diaphragm. A fixed hydraulic pressure differential is therefore set up across the diaphragm and across the metering jet controlled by the profiled needle 66. With a fixed metering pressure and a fixed metering jet, the flow through the jet is fixed. All liquid flowing through the metering device 30 must also flow through the motor gears 16 and 18 combined with the bypass line 56, and through the pair of metering gears 26 and 28. The use of the metering device 30 to establish the rate of flow through the motor gears and the first pair of metering gears also establishes the rates of flow and proportions of liquids B and C.

In making up an apparatus for a particular use, such for example as for a guided missile, the housings for the different pairs of gears may be entirely separate along the shafts so that the different liquids metered therethrough do not come in contact with each other prior to being introduced into the mixing chamber or combustion chamber of the missile. In the case of guided missiles, fuels and oxidizers are frequently stored in individual pressure chambers from which they are emptied and allowed to combine only when they are introduced into the combustion chamber. A flow combiner of the type described herein may be connected into the supply lines between the pressure chambers and the combustion chamber and utilized for metering the fuels and oxidizers. The flow combiner of the present invention may be used in other types of operations and may be modified in various respects to accommodate different situations.

In carrying out an operation such as illustrated in Fig. 1 of the drawings, the liquids A, B and C, need not be supplied at the same pressure but regardless of the pressure at which each is supplied, the particular apparatus having metering gears definitely proportioned with respect to each other will deliver the liquids into the pipe 44 and combine them in the predetermined proportions. A given flow combiner made for a particular purpose and design, to combine a plurality of liquids in predetermined proportions, may be tested for accuracy and any inaccuracies in one or more proportions of the liquids can be adjusted by providing a biasing spring for the valve pistons 48. For example, if the proportion of the liquid B should be slightly too low, the biasing spring for the piston 48 could be adjusted so that the pressure in the line 38a would be sufficiently higher than that in the line 40a to increase the flow up to the proper proportion. Other changes and modifications may be made in the apparatus without departing from the spirit and scope of the invention, as defined by the appended claims.

What we claim is:

1. An apparatus for combining a plurality of liquid streams having predetermined related rates of flow comprising a plurality of pairs of metering gears through which the streams of liquid to be combined are respectively conducted in parallel, a housing enclosing each pair of metering gears, a driving connection for each pair of metering gears, the driving connections for the pairs of gears being interconnected and arranged to drive the plurality of pairs of metering gears, a pair of motor gears for driving the plurality of pairs of metering gears connected to said driving connections, means for conducting one of the liquid streams to the pair of motor gears for driving it and in turn driving the pairs of metering gears, a metering device in said conducting means for predetermining the rate of flow of liquid conducted to and through the pair of motor gears, means for conducting the liquid passed through the pair of motor gears through one of the pairs of metering gears as the stream passed therethrough, means for delivering a stream of liquid to each remaining pair of metering gears, and means for conducting the streams of liquid from the pairs of metering gears into a common receiver.

2. An apparatus for combining a plurality of streams of liquid comprising a pair of intermeshing motor gears mounted in a housing, a pair of shafts extending into said housing on which said gears are respectively mounted, one of said gears being fixed to the shaft on which it is mounted to provide a driving shaft, a plurality of pairs of intermeshing metering gears mounted in parallel on said shafts with a gear of each pair fixed to the driving shaft, a conduit for delivering one of the streams of liquid to be combined to the pair of motor gears for driving the motor gears and in turn the pairs of metering gears, a metering device in said conduit for predetermining the rate of flow of liquid conducted therethrough to the pair of motor gears, means for conducting the stream of liquid passed through the pair of motor gears through one of the pairs of metering gears, means for delivering a separate stream of liquid to each remaining pair of metering gears, and means for conducting the streams of liquid from the metering gears to a common receiver, said pairs of metering gears having predetermined related flow capacities corresponding to the respective desired proportions of the streams of liquid to be combined.

3. An apparatus for combining a plurality of liquid streams having predetermined related rates of flow comprising a plurality of pairs of metering gears through which the streams of liquid to be combined are respectively conducted in parallel, a housing enclosing each pair of metering gears, a driving connection for each pair of metering gears, the driving connections for the pairs of gears being interconnected and arranged to drive the plurality of pairs of metering gears, a pair of motor gears for driving the plurality of pairs of metering gears and connected to said driving connections, means for conducting one of the liquid streams to the pair of motor gears for driving it and in turn driving the pairs of metering gears, means for conducting the liquid passed through the pair of motor gears to and through one of the pairs of metering gears as the stream passed therethrough, a bypass conduit for liquid having restriction means therein, the ends of which are connected respectively into the means for conducting the stream of liquid to and from the pair of motor gears, means for delivering a stream of liquid to each remaining pair of metering gears, and means for conducting the streams of liquid from the pairs of metering gears into a common receiver.

4. An apparatus for combining a plurality of liquid streams at predetermined related rates of flow, comprising a plurality of pairs of metering gears through which the streams of liquid to be combined are conducted in parallel, respectively, said pairs of metering gears being proportioned with respect to each other in accordance with the relative proportions of the liquids to be combined, a housing enclosing each pair of metering gears, a conduit for delivering one of the streams of liquid to each pair of metering gears, a common receiver, a discharge conduit for each pair of metering gears connected into said common receiver, a pair of motor gears mounted in a housing, driving connections between the pair of motor gears and the pairs of metering gears for driving them at the same rate, a discharge conduit leading from the pair of motor gears and connected into the conduit leading to one of the pairs of metering gears, means for conducting one of the plurality of liquid streams to be metered to and through the pair of motor gears to drive the pair of motor gears and the pairs of metering gears at a rate corresponding to the rate of supply of the liquid stream to the motor gears, whereby one of the liquid streams to be combined is utilized for driving the motor and metering gears and for controlling the metering of the plurality of liquid streams being combined.

5. An apparatus as claimed in claim 4 in which the pair of motor gears and the pair of metering gears receiving the stream of liquid from the motor gears have approximately the same capacity rates of flow.

6. An apparatus as claimed in claim 4 in which the pair of motor gears has a capacity rate of flow less than that of the pair of metering gears receiving the stream of liquid therefrom, and a bypass conduit having restriction means therein and connecting the inlet and discharge conduits for the pair of motor gears.

JACK ISREELI.
GEORGE T. ALLEN.

REFERENCES CITED

The following references are of record in the file of this patent:

UNITED STATES PATENTS

| Number | Name | Date |
|---|---|---|
| 1,272,212 | Callan | July 9, 1918 |
| 1,682,776 | Crabb | Sept. 4, 1928 |
| 2,024,480 | Short | Dec. 17, 1935 |
| 2,354,634 | Griswold | July 25, 1944 |
| 2,460,774 | Trautman | Feb. 1, 1949 |